Oct. 12, 1965  W. W. SALISBURY  3,211,570

PROCESS OF MAKING SINE WAVE GRATINGS

Filed Dec. 21, 1961

INVENTOR.
Winfield W. Salisbury
BY
Arthur M. Sloan
ATTORNEY

# United States Patent Office 3,211,570
Patented Oct. 12, 1965

3,211,570
PROCESS OF MAKING SINE WAVE GRATINGS
Winfield W. Salisbury, 2201 Walnut St., Garland, Tex.
Filed Dec. 21, 1961, Ser. No. 161,045
1 Claim. (Cl. 117—8)

This invention relates to methods of producing sine wave gratings.

In the interaction of moving electrons with a diffraction grating to produce radiation (see my U.S. Patents Numbers 2,634,372 and 2,688,107), the wavelengths produced represent the Fourier components of a Fourier analysis of a grating profile.

In the cases where it is desired to produce a single wavelength in a given direction, a grating profile having only one term to its Fourier representation is required. This profile is a sine wave profile.

For this reason, in order to make a device of this nature which radiates a single pure wavelength, it is necessary to design and build diffraction gratings having a cross sectional profile which approaches as closely as is mechanically possible to a sine wave.

As the sine wave is approached, then the amplitudes of the harmonic terms of the Fourier analysis are reduced. Since radiation intensity depends on the square of the amplitude of the Fourier terms, a perfect sine wave need not be produced to reduce many unwanted components to negligible levels.

An object of this invention is to provide a new and improved method of producing sine wave gratings.

Another object of this invention is to provide a new and improved method of producing diffraction gratings having grating profiles with only one term to their Fourier representation.

Still another object of this invention is to provide a new and improved method of producing diffraction gratings having cross sectional profiles which approach as closely as is mechanically possible to sine wave.

A further object of this invention is to provide a new and improved method of producing diffraction gratings which radiate a single pure wavelength.

Additional objects and advantages of the invention will be readily apparent from the reading of the following description of a process construed in accordance with the invention, and reference to the accompanying drawings thereof, wherein.

The invention can best be understood by going through the steps of the process.

Figure 1:
FIGURE 1 shows a cross sectional view of a diffraction grating with an approximate sine wave shape produced in accordance with the first step of this invention.
Figure 2:
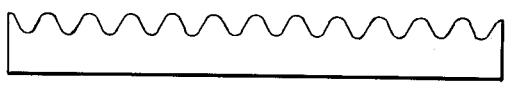
FIGURE 2 shows a cross sectional view of a diffraction grating approaching as closely as is mechanically possible to a sine wave in accordance with the final step of this invention.
Figure 3:
FIGURE 3 is a representation of the cross section of FIGURE 2 superimposed on the cross section of FIGURE 1, the cross section of FIGURE 2 being shown with broken lines.

In the first step of the process, a grating having grooves more pointed than a sine wave profile is produced by methods commonly used in the art or in the alternative a diamond or boron nitride cutting tool engraved with an approximate sine wave cutting surface is used to cut out an approximate sine wave shape on the grating material giving the cross section depicted in FIGURE 1 and in solid lines in FIGURE 3.

The second and final step in the process includes evaporation in a vacuum of silver or some other suitable substance on the sharp corners or edges of the grooves cut into the metal grating material to smooth the edges down and more nearly approach a perfect sine wave pattern.

In evaporating, the evaporated material builds up on the protuberances and in the V-shaped valleys in a manner similar to the buildup of snow falling over a flight of stairs.

The metal evaporated may be the same as the metal composing the grating or it may be a different metal from the grating material depending on the ultimate characteristics desired. For instance, in some applications it may be desirable to evaporate a material with high reflectivity but poor polishing qualities on a grating base composed of a material having low reflectivity but excellent polishing qualities. Whereas, in some other applications, it may be desirable to evaporate a material with excellent polishing qualities but low reflectivity on a grating base composed of a material having poor polishing qualities but high reflectivity.

Evaporation is carried on in steps, and the grating is examined between steps to observe higher order diffraction modes because as the sine wave profile is approached, higher order diffraction modes have a tendency to reduce or to disappear.

The grating is also tested by observing the spectrum when the electron beam passes over.

Figure 4:
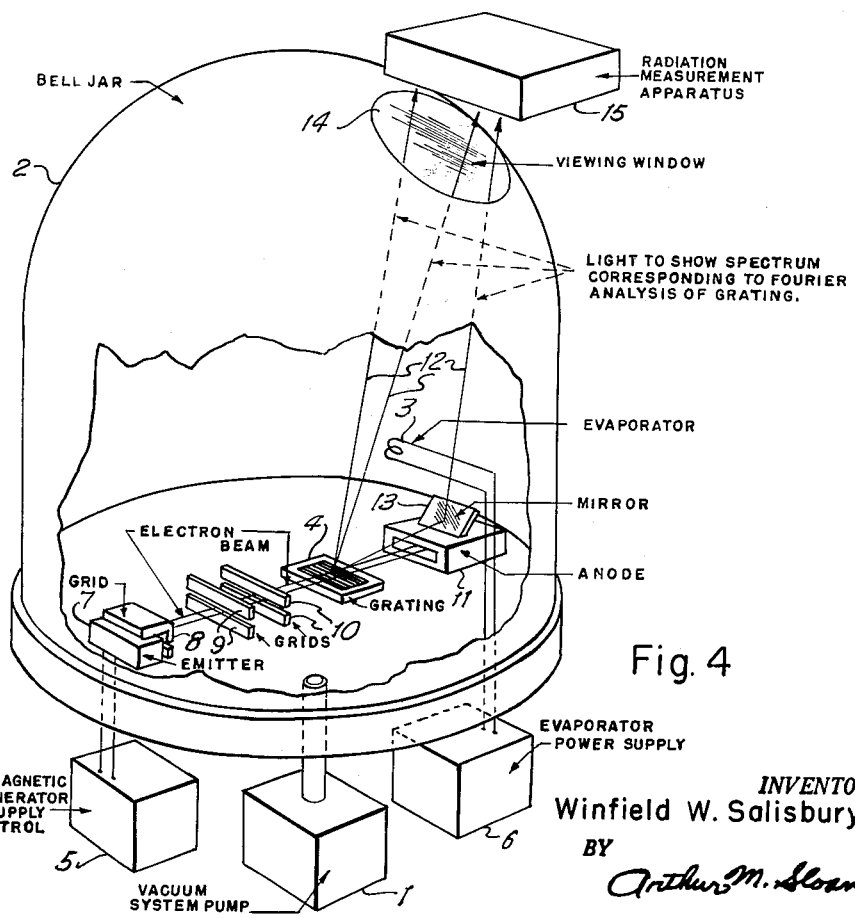
FIGURE 4 is a view of a device which may be utilized to accomplish the second step of the process, providing for the examination and testing of the grating between steps without removing the grating from the vacuum.

A device which may be utilized to accomplish the second step of the process, providing for the examination and testing of the grating between steps without removing the grating from the vacuum, is shown in FIGURE 4.

The vacuum system pump 1 creates the vacuum, in bell jar 2 and the evaporator 3 evaporates material onto the grating 4.

Power supply and control system 5 activates the electromagnetic wave generator.

Evaporator power supply 6 activates the evaporator.

Emitter 7 projects an electron beam through grids 8, 9, and 10, and over grating 4 into anode or electron collector electrode 11.

Radiation 12 is reflected from the grating 4 and the reflecting element or mirror 13 and higher order diffraction modes and the spectrum may be observed through the port 14 with radiation measurement apparatus 15 such as described below.

While evaporation is continued, the radiation from the electrons is observed by looking through a transparent auxiliary diffraction grating which may be held in the observer's hand. The spectrum of images of the interaction area of the electron beam which is seen will consist of a central image and an image on each side corresponding to each term in the Fourier series representing the grating profile which is present. The reduction of the amplitude of these Fourier series terms due to the modification of the grating profile produced by the deposit of evaporated metal on the grating surface will be accompanied by a fading of intensity of the corresponding spectrum images. A very considerable reduction of intensity for all the images should be observed before the reddest image, which corresponds to the primary mode, begins to fade. At this point, the closest possible approach to a sine wave profile which can be produced by this method is reached and the grating is ready for use.

It may be desirable to do the evaporation and observation in alternate steps but this will not interfere with the validity of the process.

While I have shown but one preferred embodiment of the present invention, it should be clear that this has been illustrative in nature and that certain variations will undoubtedly occur to those skilled in the art to which this invention pertains. I therefore intend to cover, by the appended claim, all such variations as fall within the true spirit and scope of this invention.

What I claim as my invention is:

A process of making a sine wave grating comprising cutting a metallic grating material with a tool engraved with an approximate sine wave shape, to make an approximate sine wave grating, and then evaporating a metal in a vacuum onto the sharp corners or edges of the approximate sine wave grating to round the edges and more nearly approach a sine wave pattern while simultaneously monitoring the grating by observing the spectrum when an electron beam passes over the grating followed by cessation of the metal coating deposition upon observation of the fading of the desired higher order diffraction mode.

References Cited by the Examiner

UNITED STATES PATENTS

| | | | |
|---|---|---|---|
| 1,890,893 | 12/32 | Andres | 117—8 |
| 2,314,902 | 3/43 | Shepard | 117—8 |
| 2,906,914 | 9/59 | Cutler | 315—3.5 |
| 2,908,595 | 10/59 | Kohl | 117—8 |
| 3,019,125 | 1/62 | Eggenberger et al. | 117—8 |
| 3,023,137 | 2/62 | Colborne et al. | 117—4 |
| 3,059,611 | 10/62 | Fury et al. | 118—8 |

JOSEPH B. SPENCER, *Primary Examiner.*

RICHARD D. NEVIUS, *Examiner.*